M. J. VAN AERNAM.
PASTEURIZING APPARATUS.
APPLICATION FILED NOV. 24, 1916.
1,323,428.
Patented Dec. 2, 1919.
2 SHEETS—SHEET 2.
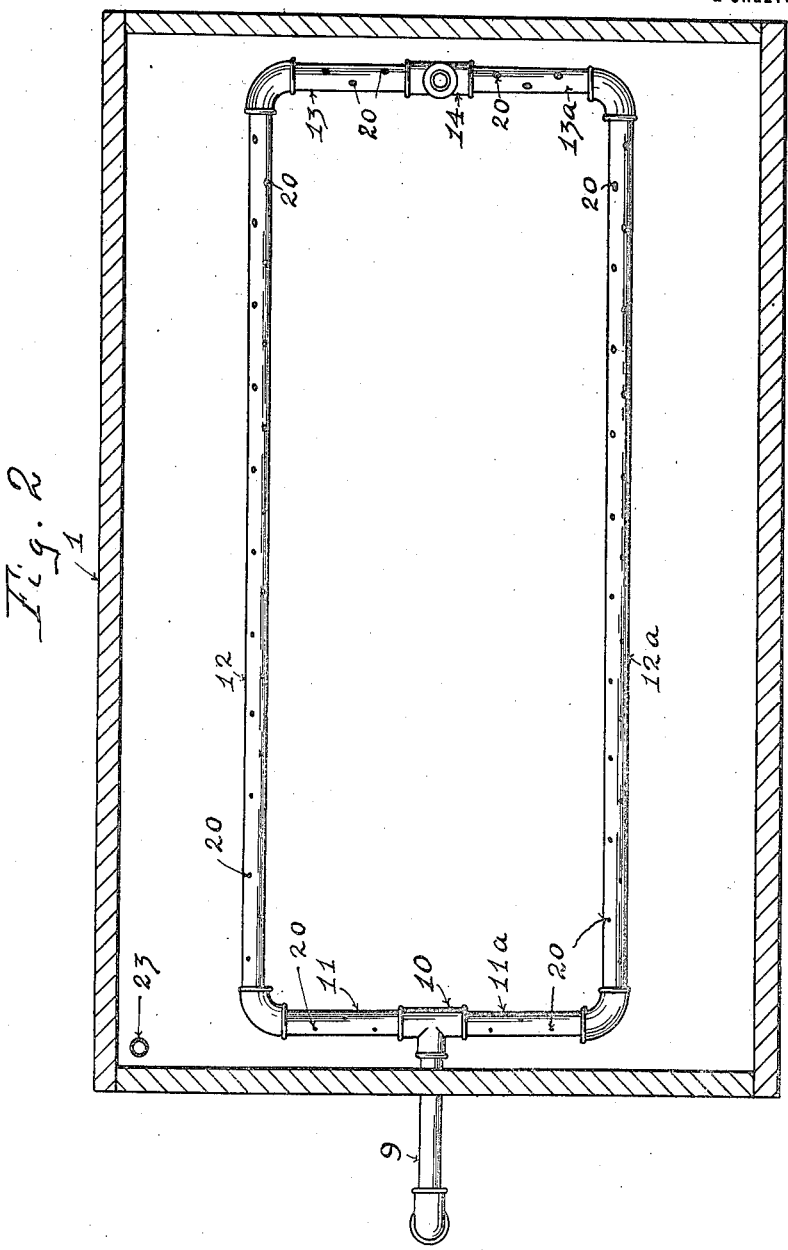
Inventor:
Marion J. Van Aernam
by
Attorney.

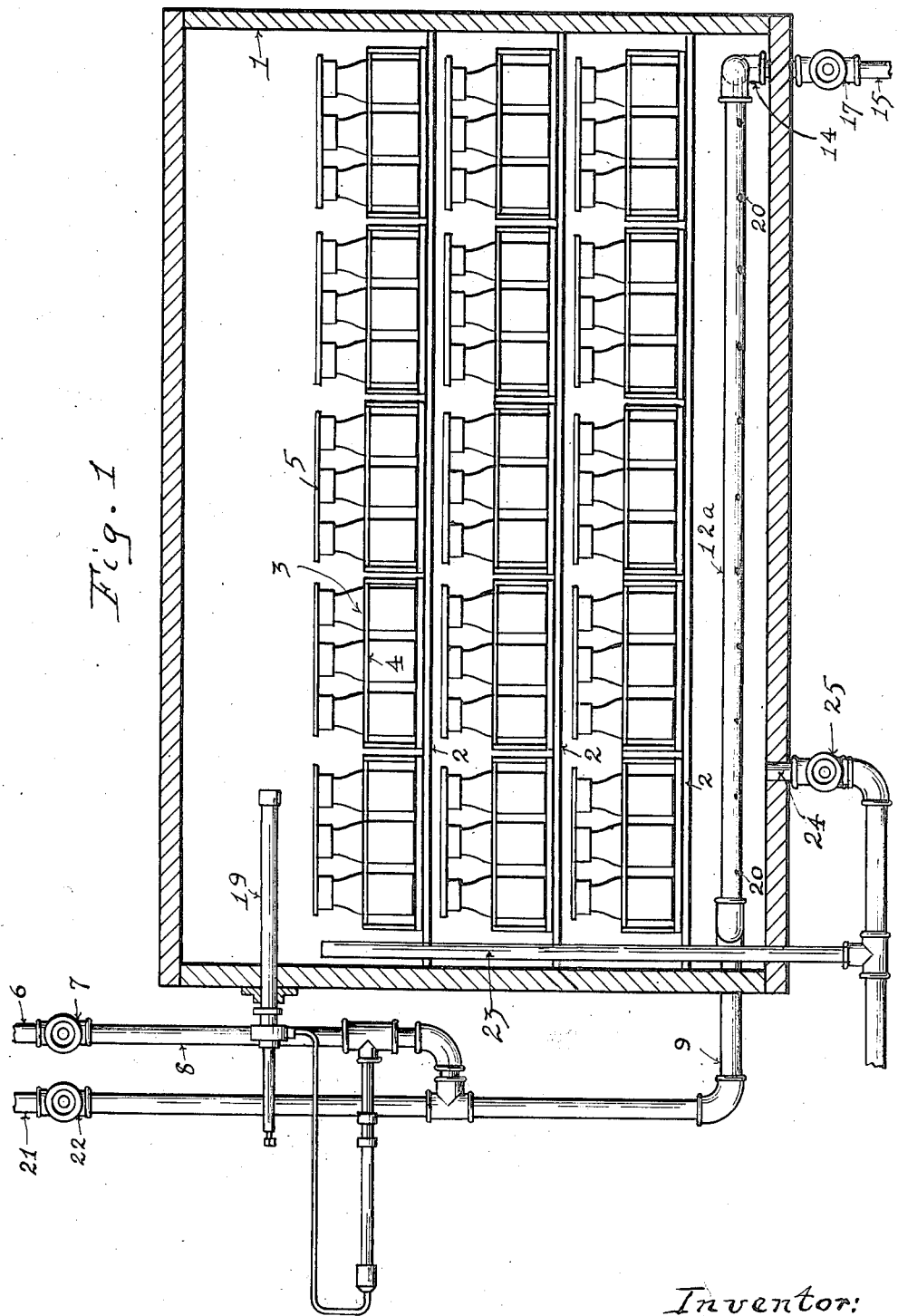

UNITED STATES PATENT OFFICE.

MARION J. VAN AERNAM, OF BUFFALO, NEW YORK, ASSIGNOR TO VAN AERNAM M'F'G COMPANY, INC., OF BUFFALO, NEW YORK, A CORPORATION OF NEW YORK.

PASTEURIZING APPARATUS.

1,323,428.      Specification of Letters Patent.      Patented Dec. 2, 1919.

Application filed November 24, 1916. Serial No. 133,249.

*To all whom it may concern:*

Be it known that I, MARION J. VAN AERNAM, a citizen of the United States, residing at Buffalo, in the county of Erie and State of New York, have invented new and useful Improvements in Pasteurizing Apparatus, of which the following is a specification.

This invention relates to pasteurizing apparatus, and more particularly to apparatus for pasteurizing milk in bottles by the direct application of steam.

It has been proposed to pasteurize milk in bottles by subjecting the bottles or similar containers directly to steam, but the process has failed of practical utility because, first, the inequality of temperature resulted in the breaking of bottles, and, second, to over heating some of the contents of the pasteurizing chamber while contents in other parts of the chamber would not be brought to a temperature sufficiently high to bring the bacterial count down to the required point.

Therefore the main object of my invention is to provide an apparatus which applies the steam at so nearly uniform heat distribution that breaking of the bottles does not occur, and also continues the application of the steam so uniformly that substantially perfect pasteurization takes place and that without over-heating or cooking any part of the contents. Other and further objects of my invention will appear from the following specification and claims and from the drawings herewith in which Figure 1 is a side elevation with one side of the container removed. Fig. 2 is an underside plan view of the steam distributer which supplies the steam, as hereafter more fully described.

The pasteurizing chamber 1 is provided with the usual removable slats 2 upon which are placed the bottles 3 preferably in racks or boxes 4. The bottles are provided with the usual caps 5. It will be understood that the chamber has a cover which closes tightly to retain the steam for the process.

A steam main 6 with a valve 7 leads to the pipe 8 through elbows and a T and the pipe 8 leads to a pipe 9 which connects with a T 10 (see Figs. 2) and from this T 10 lead branch pipes 11, 11ª, and elbows connect these pipes 12, 12ª, which in turn connect with pipes 13, 13ª, which enter T 14, and this T connects with a discharge pipe 15 having a valve 17.

The pipes 11, 11ª, 12, 12ª, and 13, 13ª are arranged near the floor of the chamber at some distance from the side walls and have discharge openings presently described. These pipes, 11, 11ª, 12, 12ª, 13 and 13ª will hereafter for brevity be referred to as the steam distributer.

Before coming to the essential feature of my invention, it is to be noted that I provide a thermostatic control of well-known type, shown at 19, which regulates the supply of steam, and consequently the temperature, during the pasteurizing process.

Coming now to the main feature of my invention, the pipes of the steam distributer are provided with discharge openings 20, upon their under sides, so arranged that the jets of steam impinge upon the floor of the chamber at an angle of about 45° and preferably alternately arranged as shown, so that steam is discharged inwardly and outwardly in substantially uniform proportions. These openings may be drill-holes in the piping or nipples of graduated sizes as presently explained. The steam thus discharged downwardly and away from the superposed milk bottles would be expected to rise in substantially uniform temperature planes, that is to say, if the temperature be taken simultaneously at different points in any horizontal plane above the steam distributer the readings would be substantially identical. Such, however, is not the fact, because, if the vents 20 in the steam distributer are all of the same diameter and in uniform frequency, the normal drop in pressure from the T 10 to the T 14 will so lessen the discharge from the openings nearest the T 14 that a horizontal reading of temperature as above described will show a progressive drop from the end adjacent the T 10 to that adjacent the T 14. Having discovered this fact and the remedy for it, I increase the diameters of the vent 20 progressively from the T 10 to that adjacent to one or the other or a vent midway between, thereby constantly delivering substantially the same number of heat units into the chamber.

This equality of heat-unit discharge may be effected preferably as shown and just described, or it may be attained otherwise.

Thus it will be seen that, by discharging the steam downwardly against the floor in the manner described there is a general distribution of steam which prevents breaking the bottles, and by attaining uniformity of discharge of heat units, as described, this danger of breaking is further lessened, and much more important, the pasteurization is rendered so nearly uniform that bacterial count indicates no difference in temperature.

Another feature in combination with the apparatus above described is the providing of a water-supply pipe 21 valved at 22, with an overflow 23 and a draw-off 24, valved at 25. By these adjuncts my invention is capable of a further improved function, namely: When the milk has been pasteurized by the steam as described, it is essential to stop the heat as soon as possible to prevent deterioration of the flavor due to slow cooking. The steam valve 7 is closed, and the valve 22 opened and cold water taking the path of the steam is discharged at the bottom of the chamber, and tempered down somewhat before it contacts the bottles. This stratum or layer of tempered water will, by reason of the downward discharge from the vents, remain on top and prevents breaking the bottles. When the water reaches the top of the overflow 23 this top layer of tempered water flows out and the entire contents come to a common temperature.

Having thus described my invention, I claim:

1. Apparatus for pasteurizing with vapor, including a chamber, and means for introducing vapor into the same and distributing said vapor in substantially regular laterally extending zones uniformly decreasing in temperature from the bottom to the top of the chamber.

2. Apparatus for pasteurizing with steam only, including a chamber receiving bottles in an upright position, means for introducing steam at the bottom of said chamber, and for distributing the same into horizontally extending uniform zones progressively decreasing in temperature from the bottom to the top to heat the bottles gradually from the bottom upward.

3. Apparatus of the character described including a pasteurizing chamber having a steam distributer arranged adjacent the floor thereof and provided with steam outlets progressively increasing in discharge capacity away from the distributer inlet end to maintain a substantially uniform discharge throughout the length and breadth of said chamber and thereby insure a uniform temperature.

4. Apparatus of the character described including a pasteurizing chamber having a steam distributer provided with steam outlets progressively increasing in discharge capacity away from the distributer inlet end to maintain a substantially uniform discharge throughout the length and breadth of said chamber and thereby insure a uniform temperature.

5. Apparatus for pasteurizing milk in bottles including a pasteurizing chamber having a steam distributer provided with steam outlets discharging only in a direction away from said bottles and progressively increasing in discharge capacity away from the distributer inlet end to maintain a substantially uniform discharge throughout the length and breadth of said chamber.

6. The combination of a chamber, means to support articles therein above the bottom thereof, and a steam pipe in the lower part of the chamber, having jet holes directed away from said articles toward the bottom of the chamber, and so proportioned and distributed that the steam will rise from the bottom of the chamber in horizontally extending uniform zones decreasing in temperature from the bottom to the top.

MARION J. VAN AERNAM.